United States Patent
Kreutzer et al.

(10) Patent No.: US 11,061,936 B2
(45) Date of Patent: Jul. 13, 2021

(54) PROPERTY GROUPING FOR CHANGE DETECTION IN DISTRIBUTED STORAGE SYSTEMS

(71) Applicant: Microsoft Technology Licensing, LLC, Redmond, WA (US)

(72) Inventors: Tor Kreutzer, Tromsø (NO); Åge Andre Kvalnes, Fetsund (NO); Øystein Torbjørnsen, Trondheim (NO); Jan-Ove Karlberg, Tromsø (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 170 days.

(21) Appl. No.: 16/392,793

(22) Filed: Apr. 24, 2019

(65) Prior Publication Data

US 2020/0342005 A1 Oct. 29, 2020

(51) Int. Cl.
*G06F 7/00* (2006.01)
*G06F 16/28* (2019.01)
*G06F 16/93* (2019.01)
*G06F 16/22* (2019.01)
*G06F 16/23* (2019.01)
*H04L 29/08* (2006.01)

(52) U.S. Cl.
CPC ........ *G06F 16/285* (2019.01); *G06F 16/2255* (2019.01); *G06F 16/2358* (2019.01); *G06F 16/93* (2019.01); *H04L 67/1097* (2013.01)

(58) Field of Classification Search
CPC .... G06F 16/285; G06F 16/93; G06F 16/2255; G06F 16/2358; H04L 67/1097
USPC .................................................. 707/600–899
See application file for complete search history.

(56) References Cited

U.S. PATENT DOCUMENTS

| | | |
|---|---|---|
| 5,898,836 A | 4/1999 | Freivald et al. |
| 6,219,818 B1 | 4/2001 | Freivald et al. |
| (Continued) | | |

FOREIGN PATENT DOCUMENTS

| | | |
|---|---|---|
| EP | 1271319 A1 | 1/2003 |
| EP | 2098962 B1 | 5/2014 |
| WO | 2007021454 A2 | 2/2007 |

OTHER PUBLICATIONS

"International Search Report and Written Opinion Issued in PCT Application No. PCT/US20/025625", dated Aug. 12, 2020, 12 Pages.

(Continued)

*Primary Examiner* — Isaac M Woo
(74) *Attorney, Agent, or Firm* — Liang IP, PLLC

(57) ABSTRACT

Techniques of property grouping for change detection in distributed storage systems are disclosed herein. In one embodiment, a method includes grouping multiple properties of a document into multiple groups individually including a subset of the multiple properties. For each of the multiple groups, a hash value of the group is generated based on values of the subset of properties in the group. The method further includes determining whether the generated hash value of the group is different than that of a corresponding group in a previous version of the document in the distributed storage system. In response to determining that generated hash value of the group is not different than that of the corresponding group in the previous version, metadata is inserted into the new version of the document indicating that none of the subset of properties in the group has changed.

20 Claims, 10 Drawing Sheets

(56) References Cited

U.S. PATENT DOCUMENTS

| | | | |
|---|---|---|---|
| 6,393,434 B1 | 5/2002 | Huang et al. | |
| 7,284,021 B2 | 10/2007 | Starbuck | |
| 9,275,368 B1 | 3/2016 | Harpalani et al. | |
| 9,524,329 B2 | 12/2016 | Dun et al. | |
| 2004/0111668 A1 | 6/2004 | Cragun et al. | |
| 2004/0153576 A1 | 8/2004 | Hansmann et al. | |
| 2009/0006860 A1 | 1/2009 | Ross | |
| 2015/0127607 A1 | 5/2015 | Savage et al. | |
| 2017/0048216 A1* | 2/2017 | Chow | G06Q 50/18 |
| 2019/0026308 A1 | 1/2019 | Davis et al. | |
| 2020/0341962 A1 | 10/2020 | Kreutzer et al. | |
| 2020/0341963 A1 | 10/2020 | Kreutzer et al. | |

OTHER PUBLICATIONS

"Hash Function", Retrieved from: https://en.wikipedia.org/w/index.php?title=Hash function&oldid=891613134, Apr. 9, 2019, 14 Pages.

"International Search Report and Written Opinion Issued in PCT Application No. PCT/US2020/025618", dated Jun. 26, 2020, 18 Pages.

"International Search Report and Written Opinion Issued in PCT Application No. PCT/US2020/025624", dated Jun. 26, 2020, 15 Pages.

"Non Final Office Action Issued in U.S. Appl. No. 16/392,781", dated Dec. 8, 2020, 9 Pages.

"Non Final Office Action Issued in U.S. Appl. No. 16/392,755", dated Nov. 25, 2020, 11 Pages.

* cited by examiner

PROPERTY GROUPING FOR CHANGE DETECTION IN DISTRIBUTED STORAGE SYSTEMS

CROSS-REFERENCE TO RELATED APPLICATION(S)

This application is related to U.S. application Ser. No. 16/392,755, filed concurrently, and to U.S. application Ser. No. 16/392,781, filed concurrently, the disclosures of which are incorporated herein in their entirety.

BACKGROUND

Distributed storage systems typically include routers, switches, bridges, and other network devices that interconnect large numbers of computer servers, network storage devices, and other types of computing devices via wired or wireless network links. The computer servers can host one or more virtual machines, containers, or other types of virtualized components to provide various computing and/or storage services to users. For example, the computer servers can be configured to provide data storage and retrieval services that allow users to store, edit, retrieve or perform other data management tasks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Today's distributed storage systems are typically arranged according to a layered architecture to provide reliable and scalable storage services to large numbers of users. Each layer of a distributed storage system can rely on a corresponding computing system for providing designed services. For example, a distributed storage system can include a storage layer that is highly scalable and capable of storing large amounts of data. The storage layer can typically include a set of backend servers configured to facilitate storage, retrieval, and/or other data management tasks for users. The set of backend servers can also provide compute resources for performing various data analysis or analytics tasks. Examples of such analytics tasks include aggregation of document views, detection of modification signals, calculations of trending documents, etc. One example of such a storage layer is the Microsoft Outlook Service® provided by Microsoft Corporation of Redmond, Wash.

While the storage layer is suitable for performing storage and analytics of large amounts of data, data structures used in the storage layer may not be suitable for providing random access of individual data items. For example, the storage layer may not access a data item in a list at a constant time independent of the position of the data item in the list or of a size of the list. Furthermore, scalability of such distributed storage systems is often achieved from splitting or "sharding" stored data or index to such data into partitions. For example, in certain distributed storage systems, a master index of data items in the storage layer can be split into multiple child indices. Instead of referencing a data item, the master index can reference a child index, which in turn can reference the data item. In such distributed storage systems, when a user requests the stored data item, multiple operations (e.g., fan-out federations) are performed in the storage layer to resolve such references. Performing the multiple operations can result in high latency and compute load in serving user requests.

One technique for providing fast random access to stored data is caching a subset of the stored data (sometimes referred to as "high impact data") in a centralized repository configured to provide a caching service for the high impact data. For example, a set of analytics servers and/or computing processes (referred to herein as "ingestion processors") running in the storage layer can be configured to push a subset of the stored data as high impact data into the centralized repository. The high impact data pushed to the centralized repository can include various categories of the stored data that various scenario computing services may be interested in. In one example, high impact data cached at the centralized repository for a document stored in the storage layer can include a document name, document extension (e.g., "txt"), a last updated date/time, a number of views of the document, a number of modifications to the document, a universal resource locator (URL) at which the document may be retrieved, and/or other suitable information related to the document. By caching the high impact data, users can readily retrieve the document and/or other related information thereof from the centralized repository.

The scenario computing services can be configured to retrieve cached high impact data from the centralized repository and react to changes in underlying data stored in the storage layer to provide corresponding user experiences. For instance, in the document example above, a search indexing service may be interested in changes to a title, a body, an appendix, or other suitable types of content of the document for updating a search index. On the other hand, a document metadata service may be interested in a list of viewers of the document and a timestamp of a last modification of the document for updating a number of views/edits to the document.

In certain distributed storage systems, once any change is detected in a stored document, a blanket notification is transmitted to all of the scenario computing services for further processing. An example of the detected change can include a write operation to a property of the document. Such a blanket notification, however, can result in waste of computing resources in the distributed storage system. First, transmission of the blanket notification may involve resource intensive notification calls (e.g., Hypertext Transfer Protocol or "HTTP" requests or remote procedure calls). Secondly, different scenario computing services may be interested in changes of different properties of the document. For instance, in the document example, the search indexing service may not be interested in a change to a list of viewers of the document or a number of modifications to the document for updating the search index. On the other hand, the document metadata service may not be interested in changes to the body or title of the document. As such, a change indicated in the blanket notification may be suitable for some scenario computing services but irrelevant to other scenario computing services. Despite the irrelevancy of a change indicated in the blanket notification, all of the scenario computing services may expend additional compute, network, input/output, and/or other suitable types of resources to determine whether the change indicated in the blanket notification is relevant to the individual scenario computing services. For example, various types of resources may be expended to perform additional read operations of the high impact data at the centralized repository. Such read operations can result in high compute load on the servers hosting the centralized repository, high network bandwidth consumption in a computer network, and/or other negative impact to the performance and/or operations of the distributed storage system.

Several embodiments of the disclosed technology can address at least some aspects of the foregoing drawbacks by implementing granular change detection of document properties in a distributed storage system. In certain implementations, a distributed storage system can include a storage layer having one or more backend servers, one or more centralized repository servers, and one or more scenario computing servers operatively coupled to one another via a computer network. The centralized repository servers can be configured to provide a centralized repository and a caching service for a subset of the data stored in the storage layer. The scenario computing servers can be configured to provide various types of computing services, such as the search index service and document metadata service described above, in reaction to changes in certain properties of documents stored in the backend storage servers.

The backend servers can be configured to provide various data storage services to facilitate storage, retrieval, modification, deletion, and/or other suitable types of data management operations. The backend servers can also be configured to provide an ingestion processor configured to analyze new and/or updated data received at and to be stored in the storage layer. In certain implementations, the ingestion processor can be configured to receive registrations or other suitable types of indications from the scenario computing services. The registrations individually indicate one or more properties of a document, a change of which a corresponding scenario computing service would like to receive a notification. Such registrations can be maintained in a data store as a list, table, or other suitable data structures.

In certain embodiments, the centralized repository can include a change detector configured to perform granular change detection of one or more properties of a data item received at the ingestion processor. Even though the change detector is described below as a part of the centralized repository, in other embodiments, the change detector can also be configured as a part of the ingestion processor, an independent computing service in the distributed storage system, or in other suitable configurations.

Using a document as an example, when a new version of a document is received at the ingestion processor, the ingestion processor can extract certain high impact data from the document and write the extracted high impact data to the centralized repository. In turn, the change detector at the centralized repository (or a component thereof) can be configured to compare various values of properties of the document in the received new version versus those in a previous version stored in the centralized repository. For instance, the change detector can compare a body and/or title of the document to determine whether a change is detected in the body and/or title. In another example, the change detector can also compare a number of views and/or a number of modifications to the document in the new version to those in the old version.

In response to detecting a change in at least one of the properties, the change detector can be configured to provide an indication to the ingestion processor regarding the detected change. In response, the ingestion processor can be configured to generate and transmit a notification to those scenario computing services that have registered to receive a notification for the detected change in the properties. For example, when a change in the body and/or title of the document is detected, the ingestion processor can be configured to transmit a notification to the search index service but not the document metadata service. On the other hand, when a change in the number of views or a number of modifications is detected, the ingestion processor can be configured to transmit a notification to the document metadata service but not to the search index service. As such, a number of notifications sent by the ingestion processor as well as subsequent read operations for verifying relevancy of the notification can be reduced, and thus resulting in lower compute load, lower network bandwidth consumption, and/or lower consumption of other resources in the distributed storage system.

In certain embodiments, detecting which one or more of the properties have changed can include associating a hash function with a property of the document and executing the associated hash function at the ingestion processor to facilitate determination of whether the corresponding property has changed. For example, the ingestion processor can be configured to apply a hash function associated with the individual properties to values of the properties in the received new version of the document to derive a hash value (referred to herein as "new hash values" or $H_{new}$). The ingestion processor can then push the generated new hash value as part of the high impact data to the centralized repository.

Upon receiving the new hash values, the change detector at the centralized repository can be configured to compare the new hash value to a previous value of the same property of the document (referred to herein as "previous hash value" or $H_{old}$) stored in the centralized repository. If the new hash value differs from the previous hash value, the change detector can indicate to the ingestion processor that a change in the property of the document is detected. If the new hash value matches or substantially matches (e.g., greater than 90% matching) the previous hash value, the change detector can indicate that the corresponding property has not changed.

Executing the hashing function in the ingestion processor can leverage high scalability of the storage layer to reduce a risk of the compute resource in the storage layer being a bottleneck. Furthermore, by selecting a hash function suitable for each property, as described in more detail below, consumption of the compute resources at the storage layer can be further reduced and the derived hash values can be of a small data size. The small data size of the produced values can result in low storage overhead in the centralized repository, low network bandwidth consumption, and efficient hash comparisons when determining whether properties have changed.

Aspects of the disclosed technology are also directed to selecting suitable hash functions to be associated with individual properties of a stored data item, such as the document described above. In certain implementations, multiple different hash functions can be statically associated with corresponding properties of the document. For example, an identity function that returns an input value as an output can be used for a number of views and a number of modifications to the document. In another example, the xxHash function may be associated with a body of the document.

In further implementations, association of a hash function with a property can be dynamic based on, for instance, a data type and/or size of values of a property. For example, the identity function can be used for properties with values that are integers or short strings (e.g., less than ten or other suitable number of characters). Thus, a number of views and a number of modifications to the document may be associated with the identity function. For values that are not integers or short strings, other hash functions that are configured to map data of the value of the property onto a hash value of a fixed size that is different than the data size of the value. For example, a Fowler-Noll-Vo (FNV) hash function may be associated with properties having values in data sizes of four to twenty bytes. A xxHash64 function may be associated with properties having values in large data sizes (e.g., greater than twenty bytes). A Secure Hash Heuristic 256 (SHA256) function may be applied to values of properties when collisions of the same data may not be tolerated, such as when a number of changes to be detected is above a threshold. For instance, when virtually every change in the properties needs to be detected, applying SHA256 to values of the properties can produce 256-bit hash values (or other threshold-bit hash values) which carry a much lower risk of producing collisions.

In certain implementations, the ingestion processor can be configured to utilize a configuration file associating a hash function to a value size range of properties. For example, properties having values smaller than or equal to four bytes can be associated with the identity function while properties having values between five to twenty bytes can be associated with FNV hash function. Properties having values larger than twenty bytes may be associated with xxHash64. Additionally, properties for which collisions cannot be tolerated under any circumstance can be associated with SHA256.

In other implementations, the ingestion processor can be configured to use a cost function to render dynamic selection of a hash function as an optimization operation. Different hash functions have different storage footprints (e.g., output hash value sizes), compute resource costs (e.g., computing costs of calculating hash values), collision rates, and/or other suitable characteristics. Thus, the optimization operation can be defined as: for a property, selecting a hash function that minimizes processor cycles and storage overhead while keeping a number of collisions below a threshold and minimizing a total amount of property data that must be read for a complete comparison. An example cost function $J_{(Hi)}$ can be represented as follows:

$$J_{(Hi)} = W_{Collision} * CR_{Hi} + W_{CPU} * CPU_{Hi} + W_{Storage} * Storage_{Hi} + W_{Data} * Data_{Hi},$$

where $CR_{Hi}$ is a collision rate, $CPU_{Hi}$ is processor cycles, $Storage_{Hi}$ is a storage size of the hash value, $Data_{Hi} \in \{PropertySize, Storage_{Hi}\}$ and W's are weights associated with various corresponding parameters.

The different weights associated with the foregoing parameters may change while the distributed storage system is operational. For example, available system resources (e.g., computing or storage) can change such that compute resources become abundant. As such, a weight used for the compute resources may be adjusted to result in a different hash function being selected for the same property than before the change in available system resources.

Additional aspects of the disclosed technology are directed to performing change detection by grouping properties that are correlated together and generate a hash value for the group of properties instead of each property in the group. Without being bound by theory, it is recognized that certain properties of a data item (e.g., a document) frequently change together. For example, a number of views often change with a number of modifications to the document. As such, combining the properties into a group and generating a hash value for the group can allow fast determination of whether any of the properties in the group has changed. If no change of the group is detected, full comparisons of each of the properties in the group can be skipped, and metadata can be added to the new version indicating accordingly. If a change in the group is detected, then each of the properties in that group may be compared to see which one or more of the properties have changed.

In accordance with additional aspects of the disclosed technology, grouping the properties can also utilize an optimization operation. If a correlation of change between different properties is used for grouping the properties, a "grouping correlation threshold" may be set such that an amount of data to be read for property and hash comparisons is below a size threshold and/or minimized. A correlation of change can include data indicating a probability (e.g., as a percentage) that a first property is likely to change when a second property is changed, or vice versa. A correlation of change can be developed via statistical analysis of historical data of the properties or via other suitable means. In some embodiments, if values of properties have been hashed, a combination operation (e.g. shifting left and performing a bitwise exclusive OR) can be used to derive a group hash value. However, if the properties have been passed through the identity function, additional hashing operations on a combination of the values of the properties (referred to as a group value) may be performed to derive a group hash value. In other embodiments, multiple groupings of properties may be used in which a property can be a part of multiple groups.

One technique for generating property groupings can include maintaining a covariance matrix for the properties. A covariance matrix is a matrix whose element in the j position is the covariance (i.e., a measure of the joint variability) between the i-th and j-th elements of a random vector. The calculation of the covariance matrix can be simplified such that if a property has changed, a value of the property is 1. If the property has not changed, the value of the property is 0. A clustering heuristic can then be used to construct groupings by assigning a property, Pi, to an existing cluster (a property group) if the property is sufficiently correlated with some (or all) properties in the property group, $P_{Cj}$, already in the cluster (i.e. the values in the covariance matrix corresponding to the property pairs <Pi, $P_{Cj}$> is above a threshold Tc. If the property is not correlated enough, i.e., no value for property Pi is above the threshold Tc in the covariance matrix, a new cluster (i.e., a new property group) containing only this property may be created. Another grouping heuristic can include determining the "closest" cluster in terms of a cluster similarity function and assigning properties to the closest cluster (i.e., property group). Regardless of which heuristic is used to create the property groupings, an amount of data to be read and compared in order to detect which properties have changed can be maintained below a threshold and/or minimized.

In certain implementations, property groupings can be calculated prior to the distributed storage system becoming operational but can also be calculated periodically in an off-line batch processing fashion. Upon determining the property grouping, a bit field where each bit corresponds to one property may be used to log which property has changed. For example, a bit can be set to zero if no change has occurred in a corresponding property. The same bit can be set to one when the corresponding property has changed. In further implementations, the property groupings may be changed in an on-line fashion, thus better accommodating temporal changes in the data. In further implementations, a single property can be included in multiple different groups. Such inclusion can allow ready change detection. For example, when a change in one group is detected but not in the other, a property in both groups can be determined to not have been changed.

DETAILED DESCRIPTION

Figure 1:
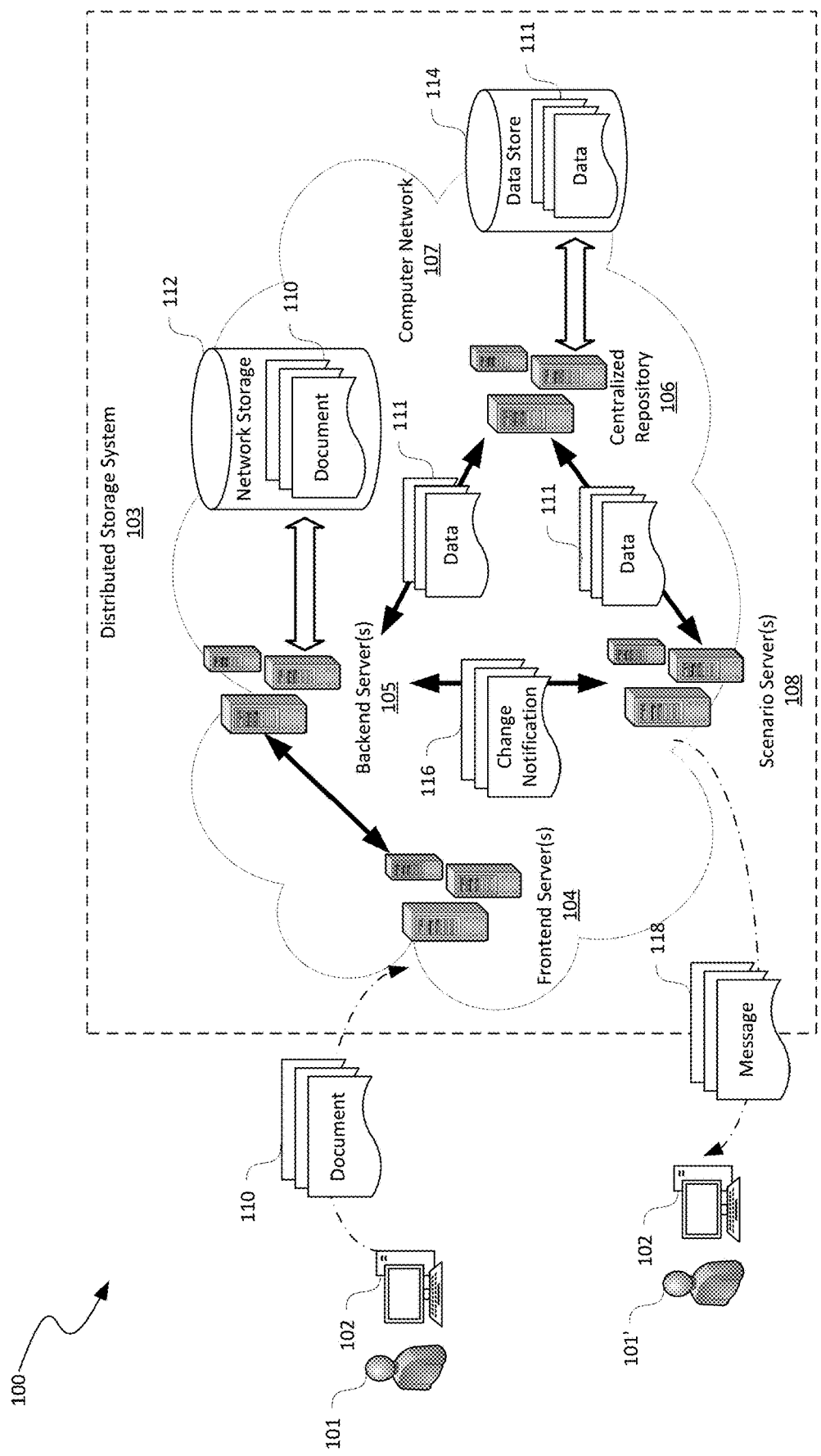
FIG. 1 is a schematic diagram illustrating a distributed storage system implementing granular change detection in accordance with embodiments of the disclosed technology.

Certain embodiments of systems, devices, components, modules, routines, data structures, and processes for granular change detection in datacenters or other suitable distributed storage systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-7.

As used herein, the term "distributed storage system" generally refers to an interconnected computer system having routers, switches, bridges, and other network devices that interconnect large numbers of computer servers, network storage devices, and other types of computing devices via wired or wireless network links to one another and/or to external networks (e.g., the Internet). The individual servers or storage nodes include one or more persistent storage devices such as hard disk drives, solid state drives, or other suitable computer readable storage media.

Also used herein, a "document" generally refers to a computer file that contains various types of data and metadata that describe and/or identify the computer file. The various types of data and metadata are referred to herein as "properties" of the document. Example properties can include a title, a content body, an author, a universal resource locator (URL), a number of views, a number of edits, and/or other suitable information related to the document. Each property can be defined as a parameter containing a corresponding value. For instance, an author property can have a value containing a name, e.g., "Nick Jones." A number of views property can include a value containing an integer, e.g., "4."

As used herein, a "version" of a document generally refers to a state or form of a document. A version can be defined by a version number, an edit date/time, an editor name, a saved date/time, and/or other suitable properties. A "new version" generally refers to a state of the document that has at least one change to any aspect of data and/or metadata of the document. For example, a new version of a document may include edits to content of the document or changes to one or more properties (e.g., a number of views) of the document. A "previous version" is another state of the document from which the new version can be derived directly or indirectly.

Also used herein, a "scenario computing service" generally refers to one or more computing resources provided over a computer network such as the Internet designed to provide a designed user experience. Example scenario computing services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

Various scenario computing services can be configured to provide different user experiences. One example scenario computing service can be configured to compile various properties of documents into a search index. In another example, another scenario computing service can be configured receive a signal representing a view of a document by a user and in response to the received signal, provide electronic messages to other users to recommend viewing of the same document. In further examples, the scenario computing services can be configured to provide other suitable user experiences.

In certain distributed storage systems, once any change is detected in a document, a blanket notification is transmitted to all scenario computing services for further processing. Such a blanket notification, however, can result in waste of computing resources in the distributed storage system. First, transmission of the blanket notification may involve resource intensive notification calls (e.g., HTTP requests or remote procedure calls). Secondly, different scenario computing services may be interested in changes of different properties of the document. For instance, a search indexing service may not be interested in a change to a list of viewers of the document or a number of modifications to the document for updating the search index. On the other hand, a document metadata service may not be interested in changes to the body or title of the document. As such, a change indicated in the blanket notification may be suitable for some scenario computing services but irrelevant to other scenario computing services.

Despite the irrelevancy of a change indicated in the blanket notification, all of the scenario computing services may expand additional compute, network, input/output, and/or other suitable types of resources to determine whether the change indicated in the blanket notification is relevant to the individual scenario computing services. For example, various types of resources may be expended to perform additional read operations. Such read operations can result in high compute load, high network bandwidth in a computer network, and/or other negative impact to the performance and/or operations of the distributed storage system.

Several embodiments of the disclosed technology can address at least some aspects of the foregoing drawbacks by implementing granular change detection of document properties in a distributed storage system. In certain implementations, a change detector can be implemented in a distributed storage system to determine which one or more of properties have changed in a new version of a document when compared to a previous version of the same document. Based on the determined one or more properties, notifications can be selectively transmitted to scenario computing services previously registered to receive notifications of changes in the one or more properties. As such, expensive HTTP requests and/or remote procedure calls to scenario computing services that are not interested to the detected change in properties may be avoided. Also, additional computing resources to determine whether a change indicated in a notification is actually relevant to a scenario computing service can also be avoided. Thus, consumption of compute loads, network bandwidths, and/or other computing resources of the distributed storage system may be reduced when compared to utilizing blanket notifications, as described in more detail below with reference to FIGS. 1-7.

FIG. 1 is a schematic diagram illustrating a computing environment 100 implementing granular change detection in accordance with embodiments of the disclosed technology. As shown in FIG. 1, the computing environment 100 can include one or more client devices 102 of corresponding users 101 and a distributed storage system 103 interconnected to the client devices 102 by a computer network (not shown) such as the Internet. Even though particular components of the computing environment 100 are shown in FIG. 1, in other embodiments, the computing environment 100 can also include additional and/or different components or arrangements. For example, in certain embodiments, the computing environment 100 can also include additional network storage devices, network devices, hosts, and/or other suitable components (not shown) in other suitable configurations.

The client devices 102 can each include a computing device that facilitates the users 101 to access cloud storage services provided by the distributed storage system 103 via a computer network. In one embodiment, the client devices 102 can each include a desktop computer. In other embodiments, the client devices 102 can also include laptop computers, tablet computers, smartphones, or other suitable computing devices. Though two users 101 and 101' are shown in FIG. 1 for illustration purposes, in other embodiments, the computing environment 100 can facilitate other suitable numbers of users 101 to access cloud storage or other types of computing services provided by the distributed storage system 103 in the computing environment 100.

As shown in FIG. 1, the distributed storage system 103 can include one or more frontend servers 104, one or more backend servers 105, a centralized repository 106, and one or more scenario servers 108 operatively coupled by a computer network 107. The backend servers 105 can be operatively coupled to a network storage 112 configured to store user data. In the illustrated example, the user data stored at the network storage 112 is shown as documents 110. In other examples, the user data can also include image files, video files, or other suitable types of computer files. Though particular components of the distributed storage system 103 are shown in FIG. 1, in other implementations, the distributed storage system 103 can also include additional and/or different components.

The computer network 107 can include any suitable types of network. For example, in one embodiment, the computer network 107 can include an Ethernet or Fast Ethernet network having routers, switches, load balancers, firewalls, and/or other suitable network components implementing an RDMA over Converged Ethernet (RoCE) protocol. In other embodiments, the computer network 107 can also include an InfiniBand network with corresponding network components. In further embodiments, the computer network 107 can also include a combination of the foregoing and/or other suitable types of computer networks.

The frontend servers 104 can be configured to interact with the users 101 via the client devices 102. For example, the frontend servers 104 can be configured to provide a user interface (not shown) on the client devices 102 to allow the corresponding users 101 to upload, modify, retrieve, or perform other suitable operations on the documents 110 stored in the network storage 112. In another example, the frontend servers 104 can also be configured to provide a user portal (not shown) that allows the users 101 to set retention, privacy, access, or other suitable types of policies to be enforced on the documents 110 in the network storage 112. In certain embodiments, the frontend servers 104 can include web servers, security servers, and/or other suitable types of servers. In other embodiments, the frontend servers 104 may be omitted from the distributed storage system 103 and instead be provided by an external computing system, such as a cloud computing system (not shown).

The backend servers 105 can be configured to provide various data storage services to facilitate storage, retrieval, modification, deletion, and/or other suitable types of data management operations on the documents 110 in the network storage 112. For example, the backend servers 105 can be configured to store the documents 110 and/or indices to the documents 110 in shards. The backend servers 105 can also be configured to provide facilities to perform fan-out federation of data from various shards in response to suitable queries from, for instance, the users 101. In further examples, the backend servers 105 can also be configured to provide facilities for performing duplication reduction, data compression, access control, and/or other suitable operations.

The backend servers 105 can also be configured to provide an ingestion processor 107 (shown in FIGS. 2A-2D) configured to analyze new and/or updated data of the documents 110 received at and to be stored in the network storage 112. In certain implementations, the ingestion processor 107 can be configured to receive registrations or other suitable types of indications from the scenario servers 108 and/or corresponding scenario computing services. The registrations can individually indicate one or more properties of a document 110, a change of which a corresponding scenario server or scenario computing service would like to receive a notification. Such registrations can be maintained as a notification list 128 (shown in FIG. 2D) in the network storage 112, a table, or other suitable data structures in other suitable data stores.

While the backend servers 105 can be suitable for performing storage and analytics of large amounts of data, data structures used in the backend servers 105 and/or the network storage 112 may not be suitable for providing random access of individual data items, such as a document 110. For example, the backend servers 105 may not access a document 110 in a list at a constant time independent of the position of the document 110 in the list or of a size of the list. Furthermore, when a user requests a stored document, multiple operations (e.g., fan-out federations) may be performed by the backend servers 105 to resolve indirect references. Performing the multiple operations can result in high latency and compute load in serving user requests.

The centralized repository 106 can be configured to provide fast random access to stored documents 110 in the network storage 112 by providing a caching service to a subset of the documents 110 (sometimes referred to as "high impact data," shown in FIG. 1 as "Data 111") cached in a data store 114. In certain embodiments, the ingestion processor 107 running in the backend servers 105 can be configured to push a subset of the stored data of the documents 110 as the data 111 into the centralized repository 106 to be stored in the data store 114.

The data 111 pushed to the centralized repository 106 can include various categories of the stored data that various scenario servers 108 and/or scenario computing services may be interested in. In one example, the data 111 cached at the centralized repository 106 for a document 110 stored in the network storage 112 can include a document name, document extension (e.g., "txt"), a last updated date/time, a number of views of the document, a number of modifications to the document, a universal resource locator (URL) at which the document may be retrieved, and/or other suitable information related to the document. By caching the data 111, users 101 can readily retrieve information of the document and/or other related information from the centralized repository 106.

The scenario servers 108 can be configured to retrieve cached data 111 from the centralized repository 106 and react to changes in underlying data of the documents 110 stored in the network storage 112 to provide corresponding user experiences. For instance, a search indexing service may be interested in changes to a title, a body, an appendix, or other suitable types of content of a document 110 for updating a search index (not shown). On the other hand, a document metadata service may be interested in a number of views or a list of viewers of the document 110 and a timestamp of a last modification of the document 110 for updating a number of views/edits to the document 110. In response to a change in the number of views, the document metadata service may be configured to transmit a message 118 to, for instance, the user 101' to inform the user 101' that the other user 101 has viewed and/or edited the document 110. Even though the scenario servers 108 are shown in FIG. 1 as physical computing devices, in some implementations, functions of the scenario services 108 can be provided as corresponding scenario computing services by suitable servers (e.g., the frontend servers 104) executing suitable instructions.

In certain distributed storage systems, once any change is detected in a stored document 110, a change notification 116 is transmitted to all of the scenario servers 108 for further processing. An example of the detected change can include a write operation to a property of the document 110. Such a blanket notification, however, can result in waste of computing resources in the distributed storage system 103. First, transmission of the change notification 116 may involve resource intensive notification calls (e.g., Hypertext Transfer Protocol or "HTTP" requests or remote procedure calls).

Secondly, different scenario servers or scenario computing services may be interested in changes of different properties of the document 110. For instance, a search indexing service may not be interested in a change to a list of viewers of the document 110 or a number of modifications to the document 110 for updating the search index. On the other hand, the document metadata service may not be interested in changes to the body or title of the document 110. As such, a change indicated in the change notification 116 may be suitable for some scenario computing services but irrelevant to other scenario computing services. Despite the irrelevancy of a change indicated in the change notification 116, all of the scenario computing services may expand additional compute, network, input/output, and/or other suitable types of resources to determine whether the change indicated in the change notification 116 is relevant to the individual scenario computing services. For example, various types of resources may be expended to perform additional read operations of the data 111 at the centralized repository 106. Such read operations can result in high compute load on the servers hosting the centralized repository 106, high network bandwidth in the computer network 107, and/or other negative impact to the performance and/or operations of the distributed storage system 103.

Several embodiments of the disclosed technology can address at least some aspects of the foregoing drawbacks by implementing granular change detection of document properties in the distributed storage system 103. In certain implementations, a change detector 122 can be implemented in the centralized repository 106 to determine which one or more of properties have changed in a new version of the document 110 when compared to a previous version of the same document 110. Based on the determined one or more properties, change notifications 116 can be selectively transmitted to scenario servers 108 previously registered to receive notifications of changes in the one or more properties. As such, expensive HTTP requests and/or remote procedure calls to scenario computing services that are not interested to the detected change in properties may be avoided. Also, additional computing resources to determine whether a change indicated in a change notification 116 is actually relevant to a scenario server 108 can also be avoided. Thus, consumption of compute loads, network bandwidths, and/or other computing resources of the distributed storage system 103 may be reduced when compared to utilizing blanket notifications, as described in more detail below with reference to FIGS. 2A-2D.

FIGS. 2A-2D are schematic diagrams illustrating certain hardware/software components of the distributed storage system 103 of FIG. 1 performing granular change detection in accordance with embodiments of the disclosed technology. In FIGS. 2A-2D and other figures herein, certain components of the computing environment 100 and the distributed storage system 103 of FIG. 1 are omitted for clarity. For example, in FIGS. 2A-2D, the frontend servers 104 and the computer network 107 are omitted from the distributed storage system 103 for convenience of illustration. In FIGS. 2A-2D and in other Figures herein, individual software components, objects, classes, modules, and routines may be a computer program, procedure, or process written as source code in C, C++, C #, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

Figure 2A:
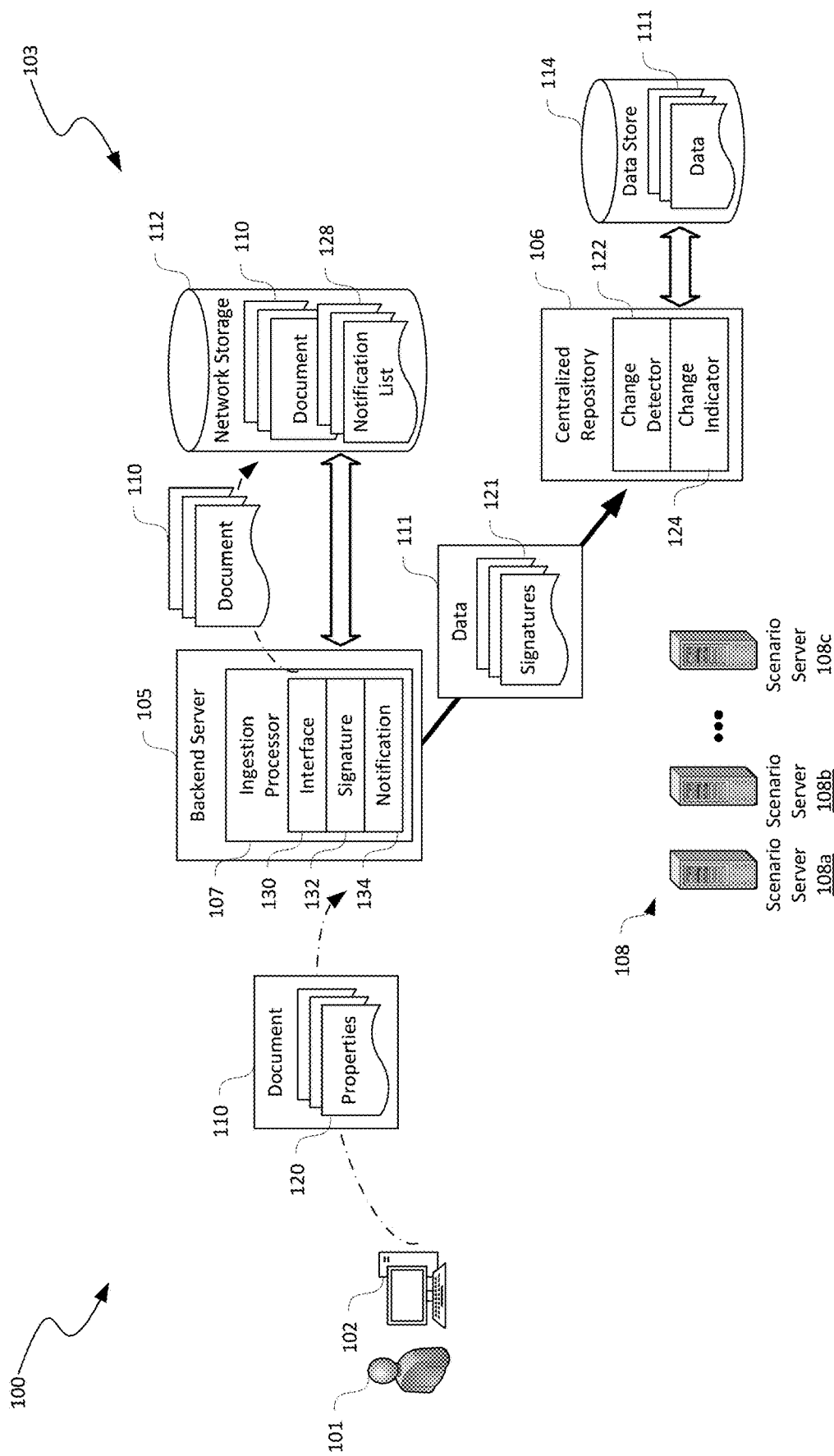
FIGS. 2A-2D are schematic diagrams illustrating certain hardware/software components of the distributed storage system of FIG. 1 performing granular change detection in accordance with embodiments of the disclosed technology.

As shown in FIG. 2A, the backend server 105 can include an ingestion processor 107 for processing a new version of a document 110 received from the client device 102 of the user 101 via the frontend server 104 (FIG. 1). The document 110 can include multiple properties 120. In the illustrated embodiment, the ingestion processor 107 can include an interface component 130, a signature component 132, and a notification component 134 operatively coupled to one another. In other embodiments, the ingestion component 107 can also include network, security, database, or other suitable types of components.

The interface component 130 can be configured to receive the new version of the document 110 and provide the received document 110 to the signature component 132 for further processing. The interface component 130 can also be configured to store, retrieve, or perform other suitable file operations to the documents 110 in the network storage 112. For example, in the illustrated embodiment, the interface component 130 can be configured to store a copy of the received new version of the document 110 in the network storage 112 as a separate file from a previous version, or replacing the previous version of the document 110.

The signature component 132 can be configured to generate a signature 121 corresponding to one or more of the properties 120. In certain embodiments, a signature 121 of a property 120 can include a hash value of the property 120. For example, a signature 121 of a content body of the document 110 can include a random alphanumeric string of a preset length. In other embodiments, a signature of a property 120 can include a value of the property 120. For example, a value of a number of views property of the document 110 can include an integer "4." In further examples, the signatures 121 can include other suitable values derived from and/or corresponding to the various properties 120 of the document 110.

As shown in FIG. 2A, upon generating the signatures 121, the signature component 132 can instruct the interface component 130 to transmit the extracted data 111 from the new version of the document 110 along with the signatures 121 to the centralized repository 106 for granular change detection. Even though embodiments of granular change detection are described herein as being implemented in the centralized repository 106, in other embodiments, such granular change detection can also be implemented on one or more of the backend servers 105 or other suitable servers (not shown) of the distributed storage system 103.

Figure 2B:
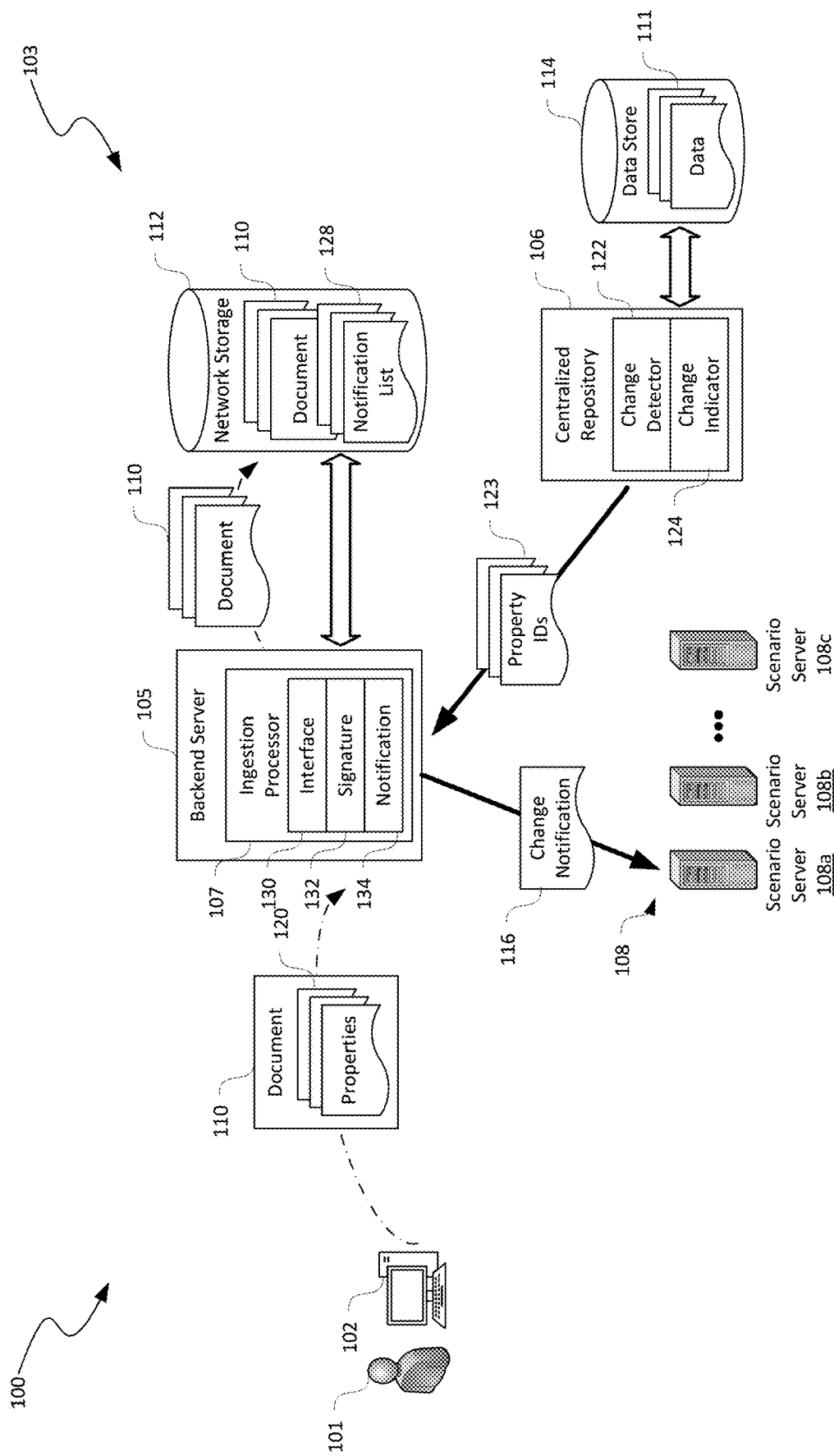

As shown in FIG. 2A, the centralized repository 106 can include a change detector 122 and a change indicator 124 operatively coupled to each other. The change detector 122 can be configured to determine detecting which one or more of the properties have changed. In certain embodiments, the change detector 122 can be configured to compare the individual signatures 121 of the new version of the document 110 with those of a previous version stored in the data store 114. In response to determining that a signature 121 of the new version is the same or substantially the same (e.g., above 90% similar), the change detector 122 can be configured to indicate that a corresponding property 120 of the document 110 has not changed. Otherwise, the change detector 122 can be configured to indicate that the corresponding property 120 has changed. As shown in FIG. 2B, upon iterating through all of the signatures 121 (FIG. 2A), the change indicator 124 can be configured to transmit a list of property IDs 123 identifying a list of properties 120 that have changed to the ingestion processor 107 at the backend server 105.

In response to receiving the property IDs 123, the notification component 134 of the ingestion processor 107 can be configured to retrieve a notification list 128 from the network storage 112. The notification list 128 can include data indicating which one or more of the scenario servers 108 (and/or corresponding scenario computing services) are interested in a change to a particular property 120 of the document 110. The notification list 128 can be generated by receiving registration data (not shown) from the scenario servers 108, by assigning default values, or via other suitable techniques. Based on the retrieved notification list 128, the notification component 134 can be configured to determine one or more scenario servers 108 to receive a change notification 125 based on the property IDs 123. In the illustrated example, a first scenario server 108a can be indicated in the notification list 128 as being interested in a change in the property 120 identified by one of the property IDs 123. As such, a change notification 116 is only transmitted to the first scenario server 108a but not the second and third scenario servers 108b and 108c.

Figure 2C:
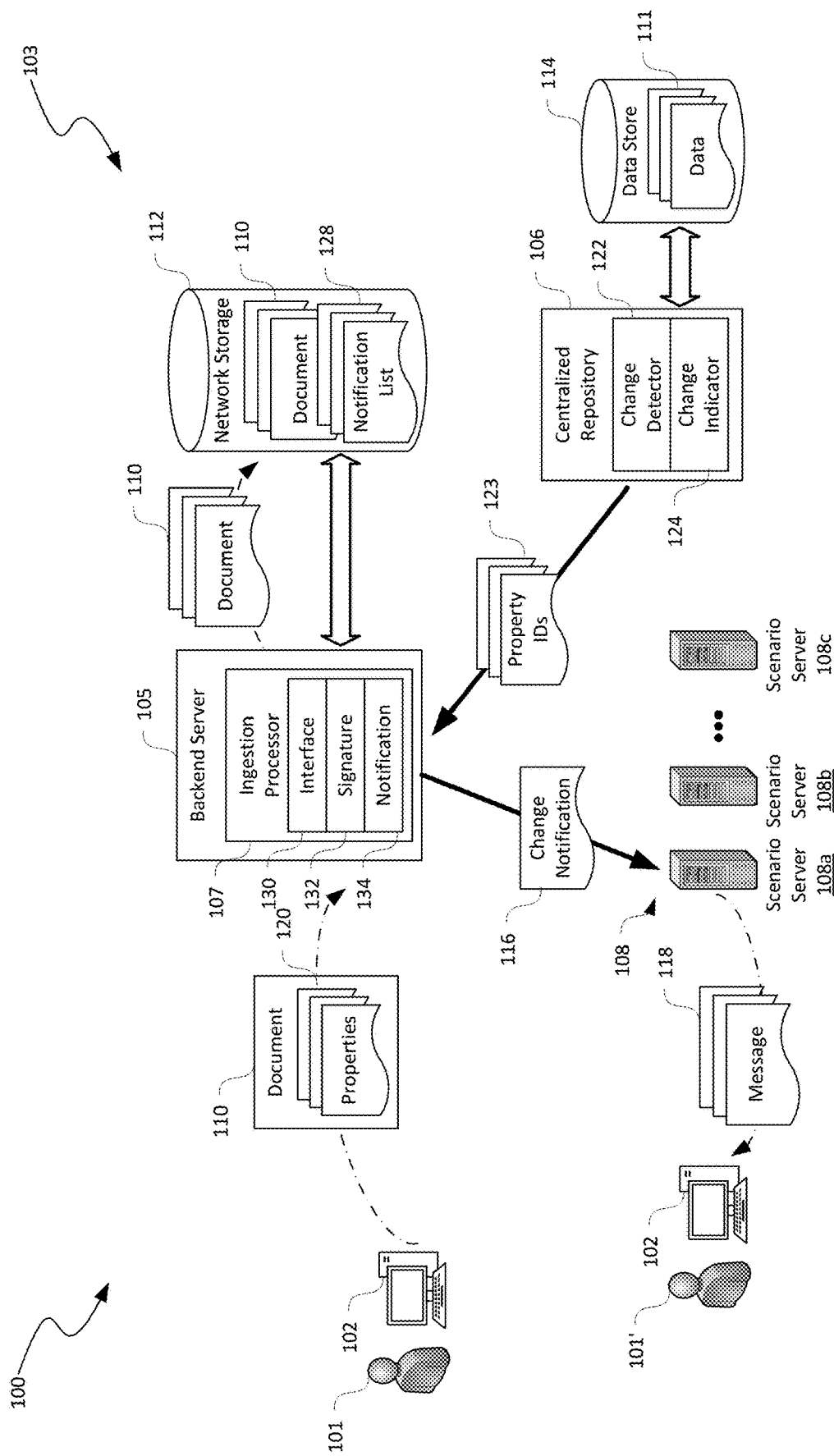
Figure 2D:
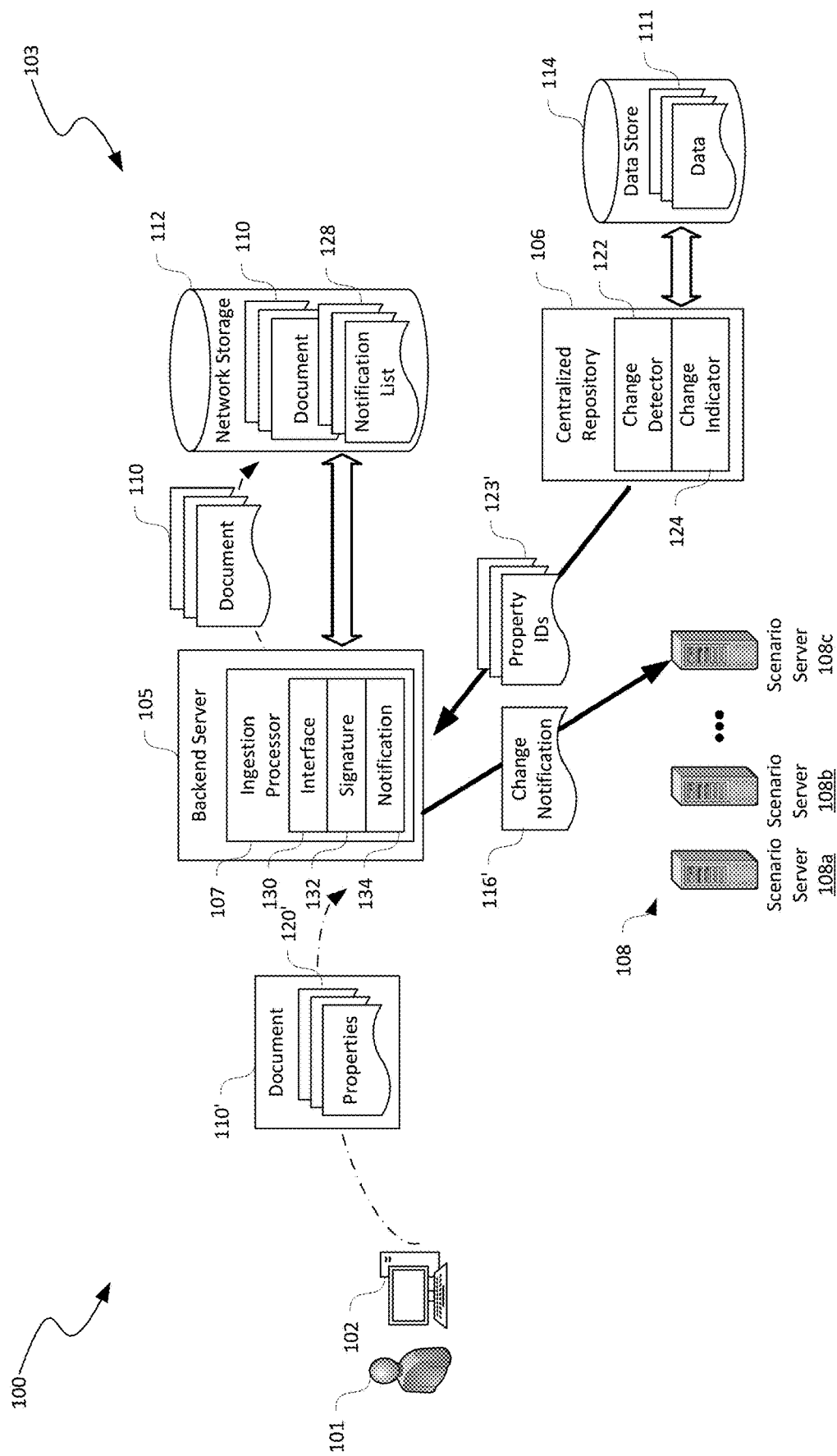

As shown in FIG. 2C, upon receiving the change notification 116, the first scenario server 108a can be configured to provide a message 118 to the user 101' to, for instance, informing the user 101' of the detected change in the property 120 of the document 110, or to provide other suitable user experiences. As shown in FIG. 2D, when the user 101 provide another version of the document 110' with different change(s) to one or more of the properties 120', the notification component 134 can be configured to provide a change notification 116' to the third scenario server 108c instead of the first or second scenario servers 108a and 108b when a change in a different property 120' is detected, as indicated by the property IDs 123'. As such, resource intensive notification calls to one or more of the scenario servers 108 as well as additional read operations by such one or more scenario servers 108 can be avoided.

Figure 3A:
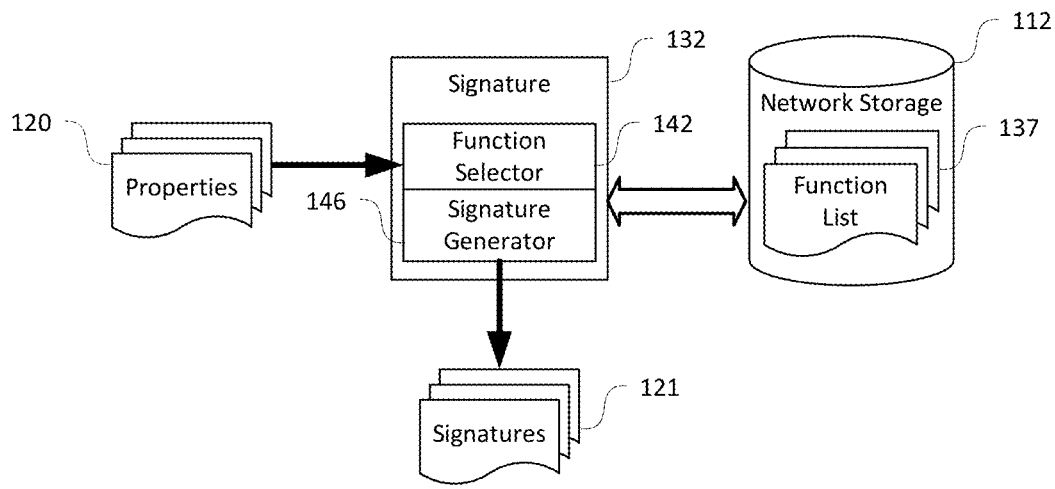
FIGS. 3A-3C are schematic diagrams illustrating certain hardware/software components of the signature component of FIGS. 2A-2D during signature generation in accordance with embodiments of the disclosed technology.
Figure 3B:
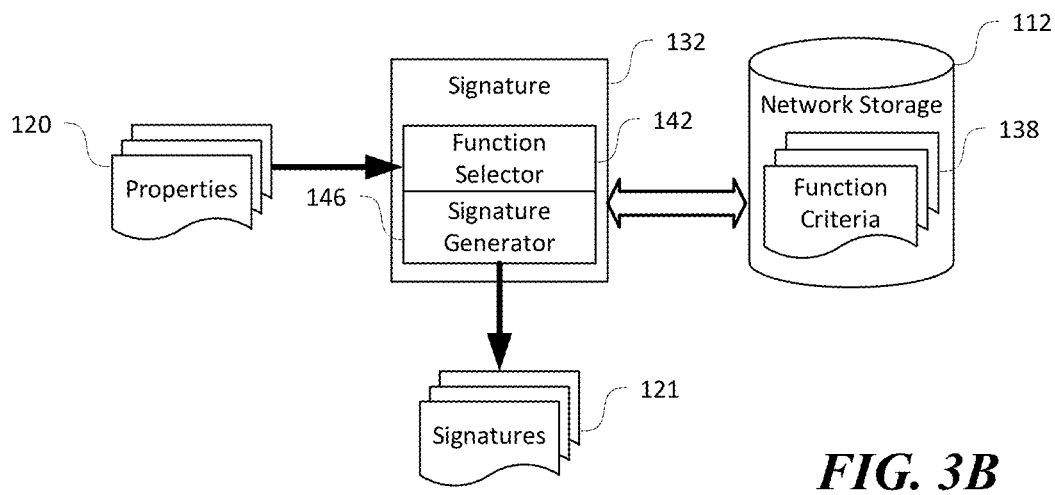
Figure 3C:
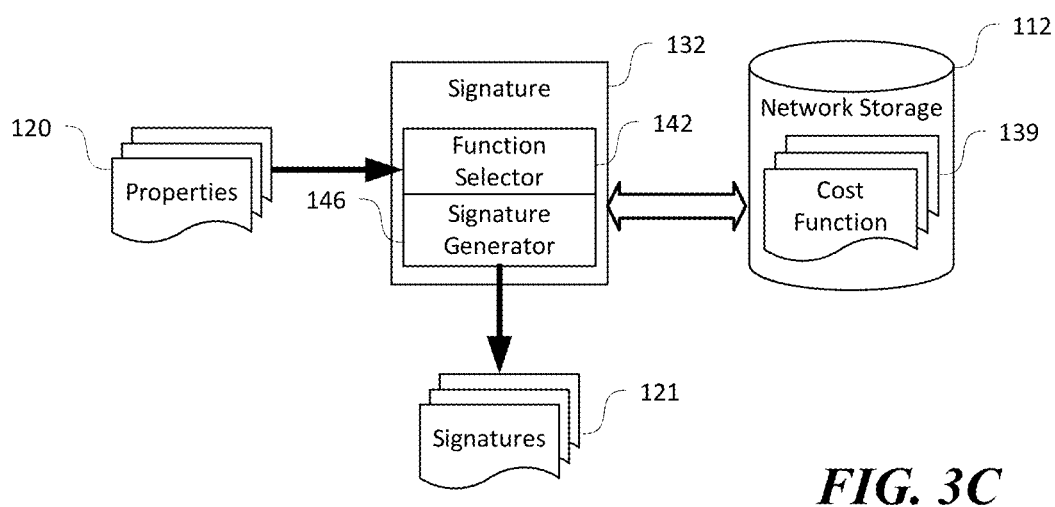

FIGS. 3A-3C are schematic diagrams illustrating certain hardware/software components of the signature component 132 of FIGS. 2A-2D during signature generation in accordance with embodiments of the disclosed technology. As shown in FIG. 3A, the signature component 132 can include a function selector 142 and a signature generator 146 operatively coupled to each other. The function selector 142 can be configured to select a function for generating a signature 121 based on a value of a property 120. As described in more detail below, the function selector 142 can be configured to select the function in various ways. The signature generator 146 can be configured to apply a selected function (e.g., a hash function) to the value of the property 120 to generate the signature 121.

Aspects of the disclosed technology are directed to selecting suitable functions to be associated with individual properties 120 of a document 110 in order to maintain a compute resource consumption at the backed server 104 (FIG. 1) below a threshold or even minimized. In certain implementations, as shown in FIG. 3A, multiple different hash functions can be statically assigned and associated with corresponding properties 120 of the document 110, as indicated in a function list 137 stored in the network storage 112. For example, an identity function that returns an input value as an output can be used for a number of views or a number of modifications to the document because a cost of computing hash values for such values may outweigh savings in compute resources used to compare these values. In another example, A xxHash function may be associated with a body of the document 110 because the body may include a large amount of data.

In further implementations, association of a hash function with a property 120 can be dynamic based on, for instance, a data type and/or size of values of a property 120 or other suitable function criteria 138, as shown in FIG. 3B. For example, the function selector 142 can be configured to determine a data type and/or size of the values of the properties 120 and assign the identity function for properties 120 with values that are integers or short strings (e.g., less than ten or other suitable number of characters) according to the function criteria 138. Thus, a number of views and a number of modifications to the document may be associated with the identity function. In other examples, the function selector 142 can be configured to assign a Fowler-Noll-Vo (FNV) hash function to properties 120 having values in data sizes of four to twenty bytes according to the function criteria 138. In further examples, the function selector 142 can also be configured to assign a xxHash64 function to properties 120 having values in large data sizes (e.g., greater than twenty bytes) according to the function criteria 138. In yet further examples, the function selector 142 can be configured to assign a Secure Hash Heuristic 256 (SHA256) function to properties 120 having values that may produce hashing value collisions and when such collisions may not be tolerated.

In further implementations, as shown in FIG. 3C, the function selector 142 can be configured to use a cost function 139 to render dynamic selection of hash functions as an optimization operation. Different hash functions can have different storage footprints (e.g., output hash value sizes), compute resource costs (e.g., costs of calculating hash values), collision rates, and/or other suitable characteristics. Thus, the optimization operation can be defined as: for a property 120, select a hash function that minimizes processor cycles and storage overhead while keeping a number of collisions below a threshold and minimizing a total amount of property data that must be read for a complete comparison. An example cost function $J_{(Hi)}$ can be represented as follows:

$$J_{(Hi)} = W_{Collision} * CR_{Hi} + W_{CPU} * CPU_{Hi} + W_{Storage} * Storage_{Hi} + W_{Data} * Data_{Hi},$$

where $CR_{Hi}$ is a collision rate, $CPU_{Hi}$ is processor cycles, $Storage_{Hi}$ is a storage size of the hash value, $Data_{Hi} \in \{PropertySize, Storage_{Hi}\}$ and W's are weights associated with various corresponding parameters.

The different weights associated with the foregoing parameters may change while the distributed storage system 103 is operational. For example, available system resources can change such that compute resources become abundant. As such, a weight used for compute resources may be adjusted to result in a different hash function being selected for the same property 120 than before the change in available system resources.

Figure 4:
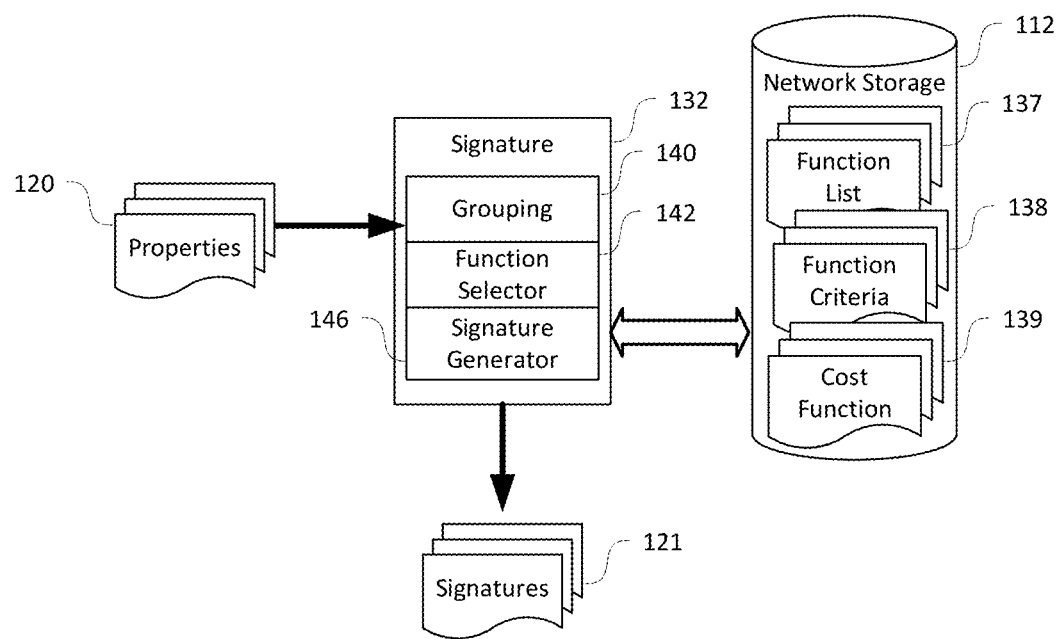
FIG. 4 is a schematic diagram illustrating certain hardware/software components of the signature component of FIGS. 2A-2D implementing property grouping in accordance with embodiments of the disclosed technology.

FIG. 4 is a schematic diagram illustrating certain hardware/software components of the signature component of FIGS. 2A-2D implementing property grouping in accordance with embodiments of the disclosed technology. As shown in FIG. 4, the signature component 132 can further include a grouping module 140 configured to group some of the properties 120 of the document 110 into a set, generate signatures 121 of the set, and allow the change detector 122 (FIG. 2A) at the centralized repository 106 (FIG. 2A) to efficiently determine which one or more of the properties 120 have changed.

In certain implementations, the grouping component 140 can be configured to group properties 120 that are correlated together and generate a signature 121 for the set of properties 120 instead of each property 120 in the set. Without being bound by theory, it is recognized that certain properties 120 of a document 110 frequently change together. For example, a number of views often change with a number of modifications to the document 110. As such, combining the properties 120 into a group or set and generating a hash value for the set can allow fast determination of whether any of the properties 120 in the set has changed. For example, if no change in the set is detected, full comparisons of each of the properties 120 in the set can be skipped by the change detector 122. If a change in the set is detected, then each of the properties 120 in that set may be compared to see which one or more of the properties 120 have changed based on the function list 137, the function criteria 138, or the cost function 139, as described above with respect to FIGS. 3A-3C.

In accordance with additional aspects of the disclosed technology, grouping the properties 120 can also utilize an optimization operation. If a correlation of change between different properties 120 is used to for grouping the properties 120, a "grouping correlation threshold" may be set such that an amount of data to be read for a property 120 and hash comparisons is maintained below a size threshold and/or minimized. In some embodiments, if values of properties 120 have been hashed, a combination operation (e.g. shifting left and performing a bitwise exclusive OR) can be used to generate a group hash value as a signature 121 for the group. However, if the properties 120 have been passed through the identity function, additional hashing operations may be performed on a combination of the values of the properties to generate a group hash value. In other embodiments, multiple groupings of properties 120 may be used in which a property 120 can be a part of multiple groups or sets.

One technique for generating property groupings can include maintaining a covariance matrix (not shown) for the properties 120. The calculation of the covariance matrix can be simplified such that if a property 120 has changed, a value of the property 120 is 1. If the property 120 has not changed, the value of the property 120 is 0. A clustering heuristic can then be used to construct groupings by assigning a property 120, Pi, to an existing cluster (a property group) if the property 120 is sufficiently correlated with some (or all) properties 120 in the property group, $P_{Cj}$, already in the cluster (i.e. the values in the covariance matrix corresponding to the property pairs <Pi, $P_{Cj}$> is above a threshold Tc.

If the property 120 is not correlated enough, i.e., no value for property Pi is above the threshold Tc in the covariance matrix, a new cluster (i.e., a new property group) containing only this property may be created. Another grouping heuristic can include determining the "closest" cluster in terms of a cluster similarity function and assigning properties 120 to the closest cluster (i.e., property group). Regardless of which heuristic is used to create the property groupings, an amount of data to be read and compared in order to detect which properties 120 have changed can be maintained below a threshold and/or minimized.

In certain implementations, property groupings can be calculated prior to the distributed storage system 103 becoming operational but can also be calculated periodically in an off-line batch or other suitable processing fashions. Upon determining the property grouping, a bit field where each bit corresponds to one property 120 may be used to log which property 120 in the group has changed. For example, a bit can be set to zero if no change has occurred in a corresponding property 120. The same bit can be set to one when the corresponding property has changed. In further implementations, the property groupings may be changed in an on-line fashion, thus better accommodating temporal changes in the data.

Figure 5:
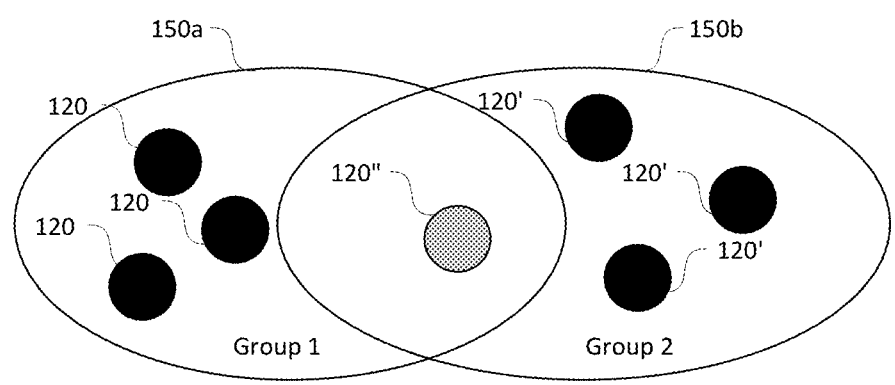
FIG. 5 is a Venn diagram illustrating one example grouping of properties in accordance with embodiments of the disclosed technology.

In further implementations, a single property 120 can be included in multiple different property groups. Such inclusion can allow ready change detection. For example, as shown in FIG. 5, a first group 150a can include four properties 120 represented as circles while a second group 150b can also include four properties 120'. The first and second groups 150a and 150b share a common property 120". As such, when a change in the first group 150a is detected but not in the second group 150b, the shared property 120" in both first and second groups 150a and 150b can be determined to not have been changed.

Figure 6A:
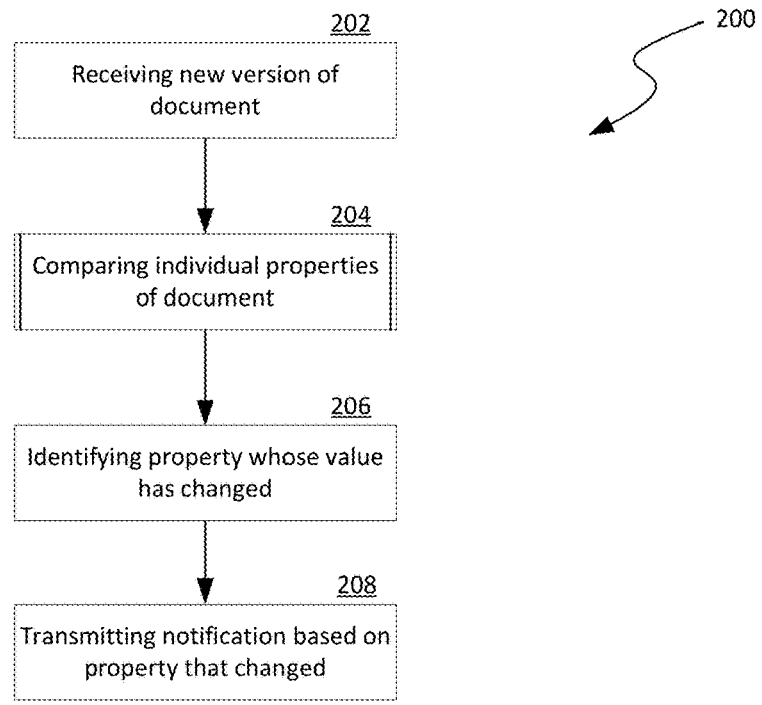
FIGS. 6A-6C are flowcharts illustrating processes for granular change detection in a distributed storage system in accordance with embodiments of the disclosed technology.
Figure 6B:
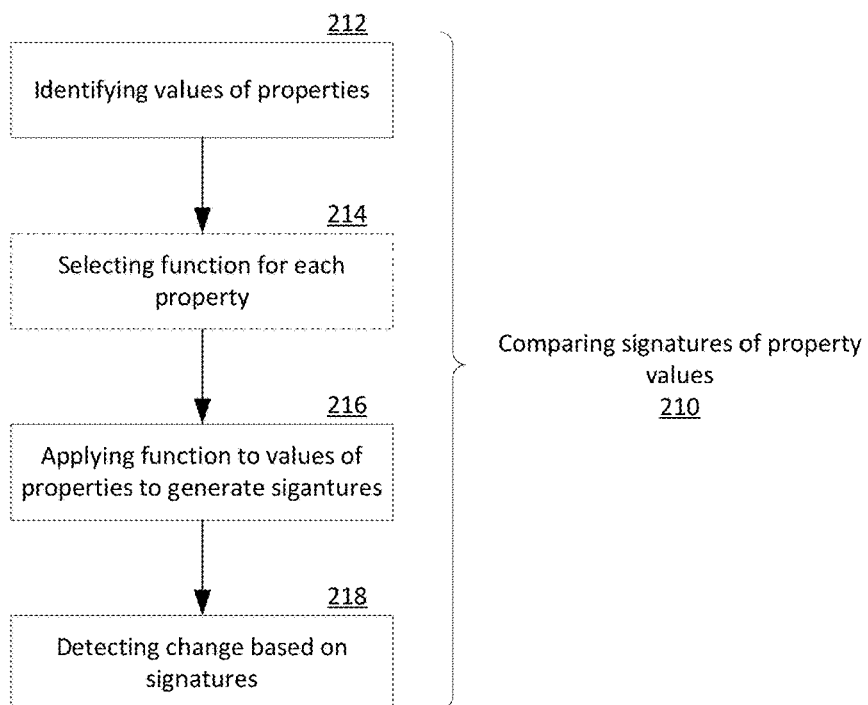
Figure 6C:
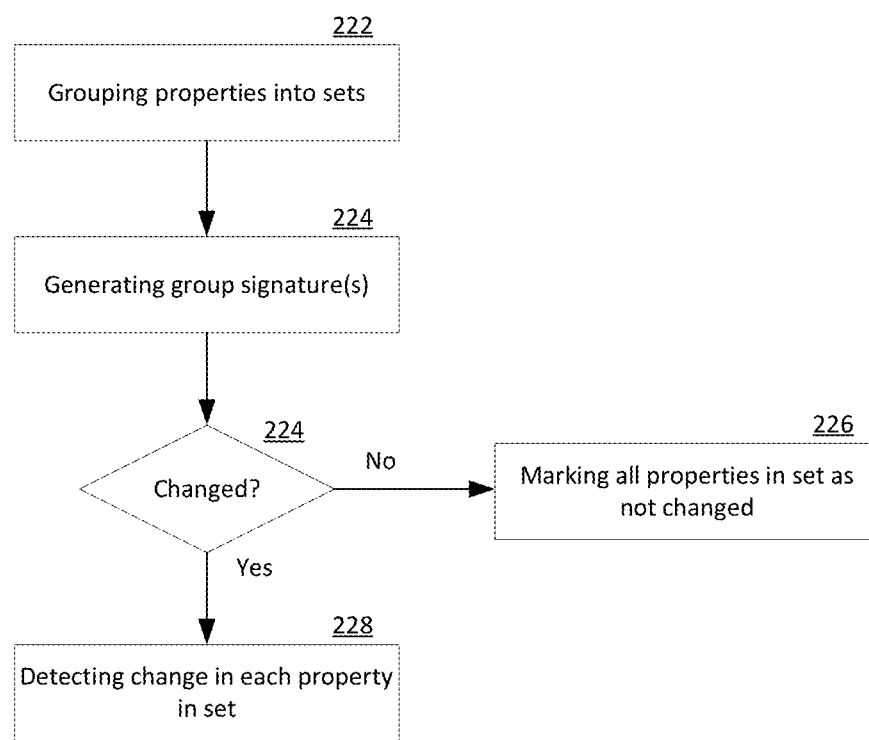

FIGS. 6A-6C are flowcharts illustrating processes for granular change detection in a distributed storage system in accordance with embodiments of the disclosed technology. Even though embodiments of the processes are described below in the context of the computing environment 100 of FIG. 1, in other embodiments, the processes can also be implemented in other computing environments with additional and/or different components.

As shown in FIG. 6A, a process 200 can include receiving a new version of a document at stage 202. In certain embodiments, the new version of the document can have a corresponding previous version stored in the distributed storage system 103 (FIG. 1). In other embodiments, the previous version of the document may not exist in the distributed storage system 103. The process 200 can then include comparing individual properties of the received new version of the document at stage 204. Various techniques of comparing the properties can be applied. Certain example techniques are described above with reference to FIGS. 2A-2D as well as described below with reference to FIG. 6B. The process 200 can also include identifying a property whose value has changed in the received new version of the document at stage 206. Upon identifying the property whose value has changed, the process 200 can proceed to transmitting a notification to a scenario server or scenario computing service previously registered to receive a notification regarding a change in the property.

FIG. 6B illustrates example operations of comparing individual properties of a document. As shown in FIG. 6B, the operations can include comparing signatures (e.g., hash values) of property values 210 that includes identifying values of the individual properties at stage 212. The operations can optionally include selecting a function for each property to generate the signature at stage 214. Various example techniques for selecting the function are described above with reference to FIGS. 3A-3C. The operations can then include applying the selected functions to values of corresponding properties to generate the signatures at stage 216. Based on the generated signatures, the operations can include detecting changes in one or more of the properties at stage 218.

FIG. 6C illustrates example operations of detecting property changes by grouping properties into sets. As shown in FIG. 6C, the operations can include grouping properties into sets at stage 222. Example techniques for grouping the properties are described above with reference to FIG. 4. The operations can then include generating group signatures for each of the sets at stage 224. For each of the sets, the operations can include a decision stage 224 to determine whether a change in the set has been detected based on the group signature. In response to determining that a change in the set has not been detected, the operations can include marking all properties in the set as being not changed. In response to determining that a change in the set has been detected, the operations can include detecting a change in one or more properties in the set at stage 228, by performing operations such as those described above with reference to FIG. 6B.

Figure 7:
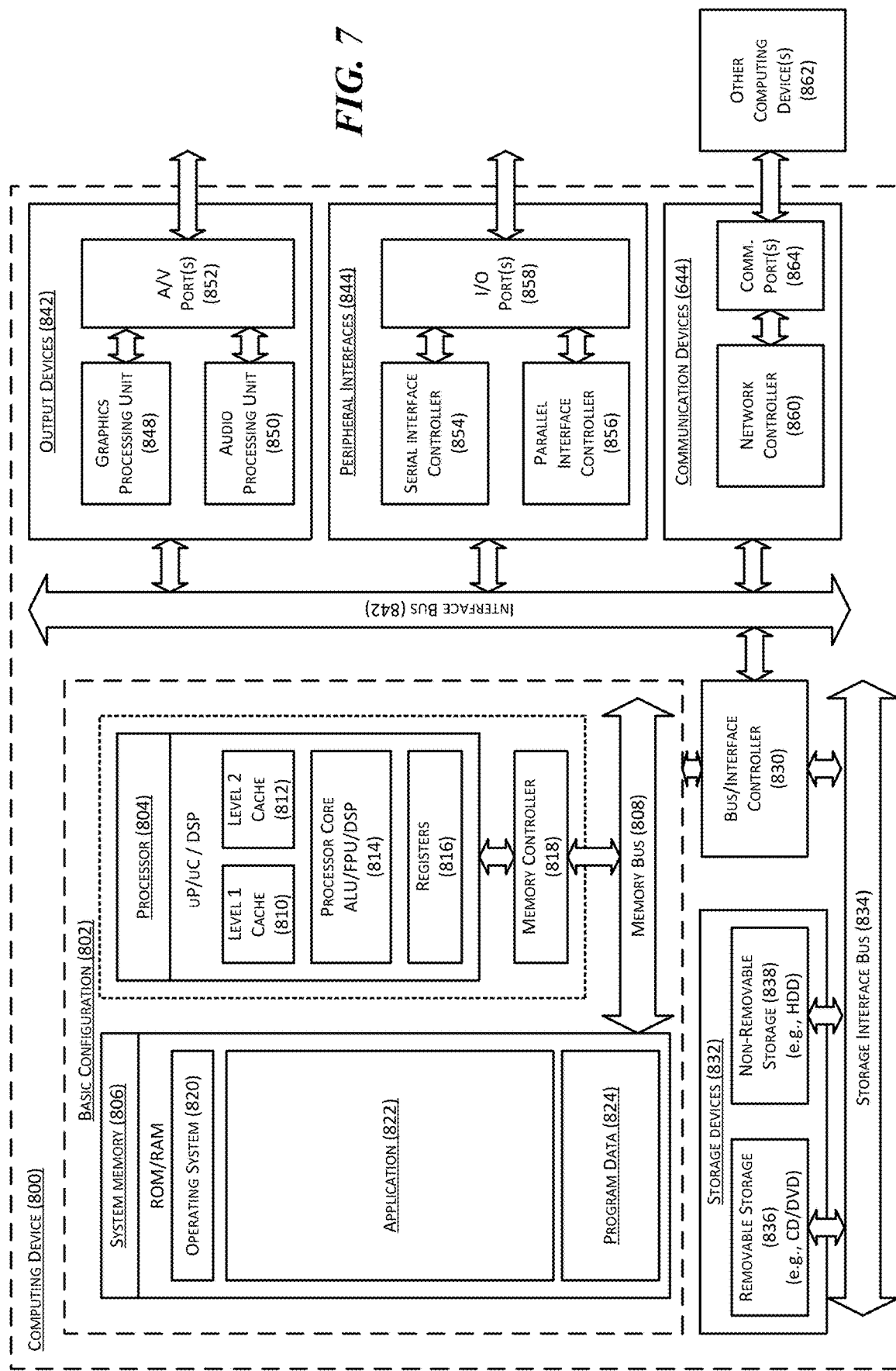
FIG. 7 is a computing device suitable for certain components of the distributed storage system in FIG. 1.

FIG. 7 is a computing device 300 suitable for certain components of the computing environment 100 in FIG. 1. For example, the computing device 300 can be suitable for the client devices 102, the frontend servers 104, the backend servers 105, the centralized repository 106, and the scenario servers 108 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 7 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for property grouping for change detection of documents stored in a distributed storage system having multiple servers interconnected to one another via a computer network, the method comprising:
  receiving, at one of the servers, data representing a new version of a document stored in the distributed storage system, the received new version of the document having multiple properties individually having a value describing or identifying the document; and
  in response to receiving the data representing the new version of the document,
    grouping the multiple properties into multiple groups individually including a subset of the multiple properties; and
    for each of the multiple groups,
      generating a hash value of the group based on values of the subset of properties in the group;
      determining whether the generated hash value of the group is different than a hash value of a corresponding group in a previous version of the document in the distributed storage system; and
      in response to determining that generated hash value of the group is not different than the hash value of the corresponding group in the previous version, inserting metadata into the new version of the document indicating that none of the subset of properties in the group has changed.

2. The method of claim 1, further comprising:
  in response to determining that generated hash value of the group is different than the hash value of the corresponding group in the previous version,
    determining whether each of the subset of the properties in the group has changed; and
    in response to determining that one of the subset of the properties has changed, transmitting, via the computer network, a notification to one or more computing services previously registered to receive a notification regarding a change in the one of the subset of the properties without transmitting the notification to other computing services not registered to receive the notification.

3. The method of claim 1 wherein grouping the multiple properties includes grouping the multiple properties into multiple groups individually including a subset of the multiple properties, the multiple groups sharing no common properties.

4. The method of claim 1 wherein grouping the multiple properties includes grouping the multiple properties into multiple groups individually including a subset of the multiple properties, at least two of the multiple groups sharing one or more properties.

5. The method of claim 1 wherein grouping the multiple properties includes:
  identifying a correlation of change between one of the properties and another of the properties, the correlation of change containing data indicating a likelihood that the one of the properties is changed when the another of the properties is changed, or vice versa;

determining whether the correlation of change exceeds a grouping correlation threshold; and in response to determining that the correlation of change exceeds the grouping correlation threshold, grouping the one of the properties and the another of the properties into a single group.

6. The method of claim 1 wherein:

each of the subset of properties includes a corresponding hash value; and generating the hash value of the group includes applying a combination operation to the hash values of the subset of properties to derive the hash value of the group.

7. The method of claim 1 wherein:

at least one of the subset of properties does not include a corresponding hash value; and generating the hash value of the group includes:
   combining the values of the subset of properties in the group into a group value; and
   applying a hash function to the group value to derive the hash value of the group.

8. The method of claim 1 wherein grouping the multiple properties includes:

calculating a covariance matrix for the multiple properties; and based on the covariance matrix, assigning one of the properties to one of the groups when the one of the properties has a covariance with at least one of the properties of one of the groups that is above a threshold.

9. The method of claim 1 wherein grouping the multiple properties includes:

calculating a covariance matrix for the multiple properties; and based on the covariance matrix, assigning one of the properties to a new group when the one of the properties does not have a covariance with at least one property of one of the groups that is above a threshold.

10. A computing device for property grouping for change detection of data stored in a distributed storage system having multiple servers interconnected to one another via a computer network, the computing device comprising:

a processor; and a memory having instructions executable by the processor to cause the computing device to:
   upon receiving data representing a new version of a document having multiple properties individually having a value describing or identifying the document, for each of the properties,
   group the multiple properties into multiple groups individually including a subset of the multiple properties; and
   for each of the multiple groups,
      generate a hash value of the group based on values of the subset of properties in the group;
      determine whether the generated hash value of the group is different than a hash value of a corresponding group in a previous version of the document in the distributed storage system; and
      in response to determining that generated hash value of the group is not different than the hash value of the corresponding group in the previous version, insert metadata into the new version of the document indicating that none of the subset of properties in the group has changed.

11. The computing device of claim 10 wherein the memory includes additional instructions executable by the processor to cause the computing device to:

in response to determining that generated hash value of the group is different than the hash value of the corresponding group in the previous version,
   determine whether each of the subset of the properties in the group has changed; and
   in response to determining that one of the subset of the properties has changed, transmit, via the computer network, a notification to one or more computing services previously registered to receive a notification regarding a change in the one of the subset of the properties without transmitting the notification to other computing services not registered to receive the notification.

12. The computing device of claim 10 wherein to group the multiple properties includes to group the multiple properties into multiple groups individually including a subset of the multiple properties, at least two of the multiple groups sharing one or more properties.

13. The computing device of claim 10 wherein to group the multiple properties includes to:

identify a correlation of change between one of the properties and another of the properties, the correlation of change containing data indicating a likelihood that the one of the properties is changed when the another of the properties is changed, or vice versa;

determine whether the correlation of change exceeds a grouping correlation threshold; and in response to determining that the correlation of change exceeds the grouping correlation threshold, group the one of the properties and the another of the properties into a single group.

14. The computing device of claim 10 wherein:

at least one of the subset of properties does not include a corresponding hash value; and to generate the hash value of the group includes to:
   combine the values of the subset of properties in the group into a group value; and
   apply a hash function to the group value to derive the hash value of the group.

15. The computing device of claim 10 wherein to group the multiple properties includes to assign one of the properties to one of the groups when the one of the properties has a covariance with at least one of the properties of one of the groups that is above a threshold.

16. The computing device of claim 10 wherein to group the multiple properties includes to assign one of the properties to a new group when the one of the properties does not have a covariance with at least one properties of one of the groups that is above a threshold.

17. A method for property grouping for change detection of documents stored in a distributed storage system having multiple servers interconnected to one another via a computer network, the method comprising:

upon receiving, at one of the servers, data representing a new version of a document stored in the distributed storage system, the received new version of the document having multiple properties each having a value describing or identifying the document, grouping the multiple properties into multiple groups individually including a subset of the multiple properties; and for each of the multiple groups,
   generating a hash value of the group based on values of the subset of properties in the group;

determining whether the generated hash value of the group is different than a hash value of a corresponding group in a previous version of the document in the distributed storage system; and in response to determining that generated hash value of the group is different than the hash value of the corresponding group in the previous version, determining whether each of the subset of the properties in the group has changed; and in response to determining that one of the subset of the properties has changed, transmitting, via the computer network, a notification to one or more computing services previously registered to receive a notification regarding a change in the one of the subset of the properties without transmitting the notification to other computing services not registered to receive the notification.

18. The method of claim 17 wherein grouping the multiple properties includes:

identifying a correlation of change between one of the properties and another of the properties, the correlation of change containing data indicating a likelihood that the one of the properties is changed when the another of the properties is changed, or vice versa;

determining whether the correlation of change exceeds a grouping correlation threshold; and in response to determining that the correlation of change exceeds the grouping correlation threshold, grouping the one of the properties and the another of the properties into a single group.

19. The method of claim 17 wherein grouping the multiple properties includes:

calculating a covariance matrix for the multiple properties; and based on the covariance matrix, assigning one of the properties to one of the groups when the one of the properties has a covariance with at least one of the properties of one of the groups that is above a threshold.

20. The method of claim 17 wherein grouping the multiple properties includes:

calculating a covariance matrix for the multiple properties; and based on the covariance matrix, assigning one of the properties to a new group when the one of the properties does not have a covariance with at least one property of one of the groups that is above a threshold.

* * * * *